Dec. 23, 1969 E. A. SALO 3,486,033
MEANS FOR PROTECTING ELECTRICAL SYSTEMS AGAINST
FREQUENCY VARIATION
Filed Dec. 26, 1967 4 Sheets-Sheet 3

INVENTOR.
ERIC A. SALO
BY
Naylor & Neal
ATTORNEYS

Dec. 23, 1969     E. A. SALO     3,486,033
MEANS FOR PROTECTING ELECTRICAL SYSTEMS AGAINST
FREQUENCY VARIATION

Filed Dec. 26, 1967     4 Sheets-Sheet 4

INVENTOR.
ERIC A. SALO
BY
Naylor & Neal
ATTORNEYS

United States Patent Office 3,486,033
Patented Dec. 23, 1969

3,486,033
MEANS FOR PROTECTING ELECTRICAL SYSTEMS AGAINST FREQUENCY VARIATION
Eric A. Salo, San Lorenzo, Calif., assignor to Eryx Corporation, San Lorenzo, Calif., a corporation of California
Filed Dec. 26, 1967, Ser. No. 693,608
Int. Cl. H02j 3/14
U.S. Cl. 307—39
5 Claims

ABSTRACT OF THE DISCLOSURE

Protective apparatus for electrical power systems operable to continually sense the electrical frequency of a power system, to continually compare the sensed frequency with a standard reference frequency, to open load circuit breakers when the difference between standard frequency and sensed frequency and/or the rate of change between these two frequencies indicates that the system is being subjected to a load increase beyond its generation capability, and to close circuit breakers when the difference between standard frequency and sensed frequency and/or the rate of change between these two frequencies indicates that the system is being subjected to a load increase within its generation capability.

This protective apparatus includes a frequency differential generator which provides a polyphase voltage proportional to the detected frequency difference, a converter to change the polyphase voltage to a proportional direct current voltage, a detector such as a polarity switch to determine whether the sensed frequency is higher or lower than the standard frequency, a converter to determine the rate of change between the standard frequency and the system frequency, and frequency change and frequency rate of change indicators and relays operable to add or drop load in accordance with a predetermined programming.

BRIEF SUMMARY OF THE INVENTION

The subject invention consists of a number of elements mechanically and electrically interconnected to monitor the frequency of an electrical system and to provide electrical signal impulses reflecting both the difference of the system frequency from normal and the rate of change of the system frequency.

It is known that in any alternating current power system deviations in frequency reflect differences between input and output. When a momentary increase in electrical load occurs, there is a momentary decrease in the system frequency until the system generation is increased to equal the changed electrical demand. Furthermore, the rate of decay of the system frequency is proportional to the difference between generation and demand. A principal objective of the invention is to continuously compare the actual frequency of a power system with its normal or standard frequency, to continuously determine both the difference between these two frequency values and the instantaneous rate of change between the two frequencies, to open circuit breakers to reduce electrical load on the power system when the frequency of the system has dropped below the operating norm and when the rate of the frequency reduction indicates that the generation capability of the system is inadequate for the load connected into it, and when continued operation without reduction in the electrical load would force the system frequency still lower to the point where the system would collapse because of the inherent lower power generating capability at appreciably lower frequencies.

Conversely, the subject invention makes it practical to automatically close load circuit breakers when the rate of frequency decay has reversed and the operating frequency is close enough to normal to make the system stable on load reconnection.

DETAILED DESCRIPTION

Figure 1:
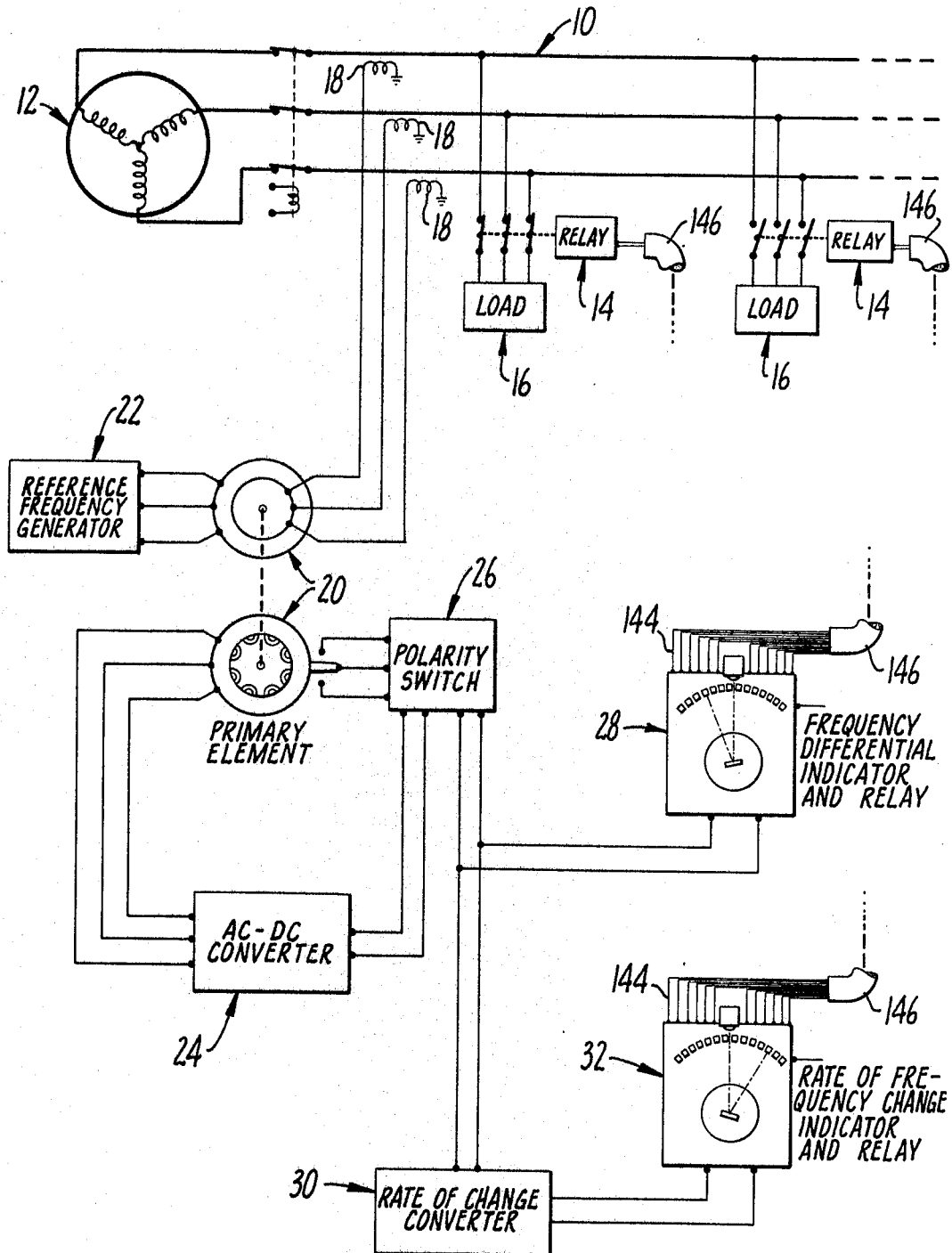
FIG. 1 is a view of a power generating system having the protective apparatus of the invention disposed in load-connecting and load-disconnecting control with said power system.

With reference to FIG. 1, an electrical power system 10 including a generator 12 and a plurality of relays 14 to connect or disconnect increments of load 16 to or from the system 10 is provided with protective control apparatus comprising: instrument transformers 18 circuit-connected to a primary element, or frequency differential signal generator, 20, a reference frequency generator 22 connected to said primary element 20, a converter 24 circuit-connected to said primary element and adapted to receive therefrom a polyphase voltage signal and convert said signal to a proportional direct current voltage signal, a polarity switch 26 operably related to said primary element 20 and adapted to sense whether the actual frequency of the power system 10 is greater than or less than the frequency of the output of generator 22, a frequency differential indicator connected to the output side of the polarity switch 26 and adapted to indicate the difference and the sign of the difference between the frequencies of system 10 and generator 22 and communicate with and condition the relays 14 accordingly, a converter 30 connected to the output side of polarity switch 26 and adapted to convert the signal received from switch 26 to a signal which is indicative of the simultaneous rate of change between the frequency of system 10 and that of generator 22, and a rate of frequency change indicator 32 connected to the output side of converter 30 and adapted to indicate the instantaneous rate of change between said frequencies and to communicate the same to the relays 14 for operation of the latter. When the signals transmitted to the relays 14 by the indicators 28 and 32 are such as to indicate that the frequency of generator 22 is higher than the frequency of system 10 and/or that the rate of change between these frequencies connotes a load increase on system 10 greater than the capability of the generation power of the system to handle, the relays 14 are sequentially operated to cut out successive loads 16 until the load remaining on the system 10 is within the capability of the generation power of the system to handle. Conversely, when the frequency of system 10 and the rate of decrease of frequency of said system indicate electrical load within the capability of the generation power of system 10, the frequency signal impulses imparted to the relays 14 by the indicators 28 and 32 cause a closing of load applicator switches until the load increments 16 connected to the system 10 reach a normal load value for the system.

Figure 3:
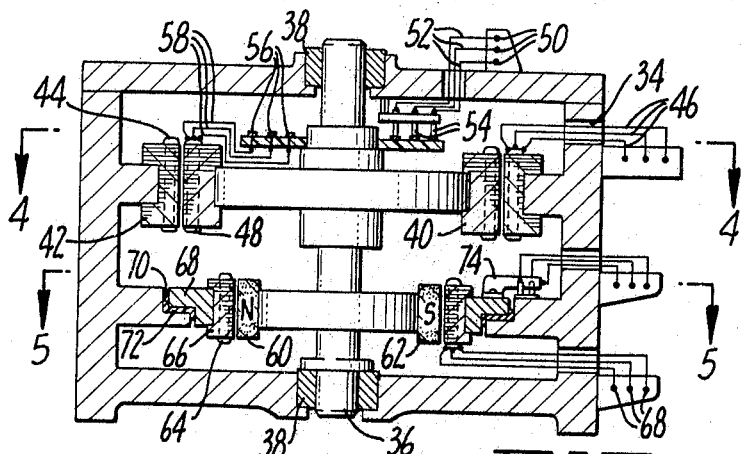
FIG. 3 is a view, partly in section and partly in elevation, of the primary element of the sensing and control apparatus of the invention.
Figure 4:
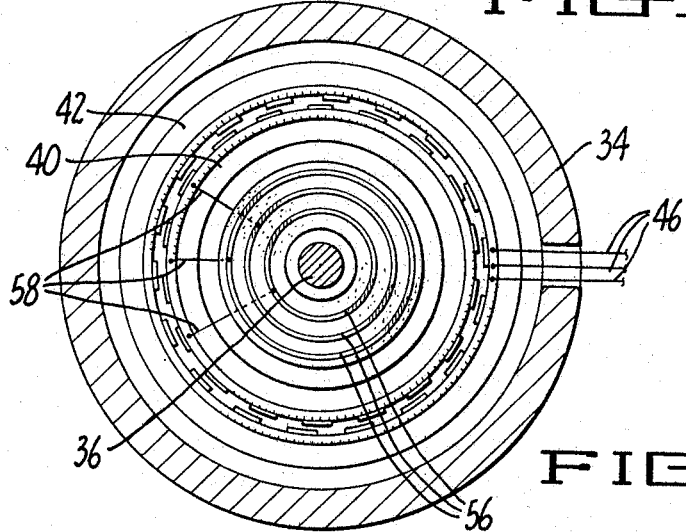
FIG. 4 is a view taken along lines 4—4 of FIG. 3.

Primary element 20 is shown in structural and operational detail in FIG. 3, said element comprising a cylindrical housing 34, a rotor 36 supported for rotation by bearings 38, a laminated electrical iron core 40 affixed to rotor 36, a laminated electrical iron core 42 affixed to the housing 34 in radial alignment with core 40. Cores 40 and 42 are provided with polyphase electrical windings which have the same number of poles and which share a rotating magnetic field such as that which is associated with a synchronous type of dynamo. The stator winding 44 is connected through leads 46 to reference frequency generator 22, being thereby provided with polyphase voltages at the alternating current frequency for which the related electrical system 10 is designed. The rotor winding 48 is provided with polyphase voltages by means comprising the instrument transformers 18 which are connected to the terminals 50, leads 52 interconnecting terminals 50 and brushes 54, collector rings 56 which makes sliding contact with the brushes 54, and leads 58 which interconnect rings 56 and coils 48.

The rotation of the magnetic field in the stator coils 44 and in the rotor coils 48 is in the same direction. Consequently, when the frequency of the electrical system 10 is identical with the reference frequency impressed upon the stator windings 44 by generator 22, there is no angular motion of the rotor 36. When the frequency of system 10 is momentarily reduced, as by an instantaneous increase in electrical load, the resulting lower frequency of system 10 causes the rotor 36 to revolve to make up mechanically for the loss in electrical speed. The speed of rotation of the rotor 36 is exactly equivalent to the difference between the system frequency and the reference frequency, the rotation of the rotor being in one direction for under-frequency and in the opposite direction for over-frequency.

The primary element 20 further comprises a permanent magnet field, with north poles 60 and south poles 62, fixed to rotor 36, said field being disposed in magnetic and mechanical alignment with polyphase winding 64 which is mounted on laminated core 66 in such a manner as to produce a polyphase electrical alternating current which is electrically conducted outside the housing 34 to the terminals 68. This signal generator portion of the primary element performs precisely as a synchronous generator, excited by the rotor permanent magnets, to produce a polyphase generated voltage having a frequency which is essentially proportional to the difference between the frequency of the electrical system 10 and the reference frequency furnished by generator 22.

Figure 5:
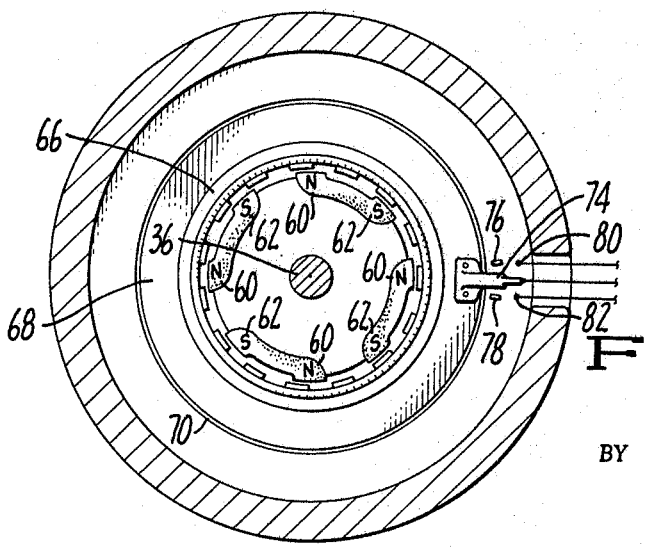
FIG. 5 is a view taken along lines 5—5 of FIG. 3.

A further function of the primary element 20 is to provide directional or polarity indication of the rotation of rotor 36. The core 66 of the signal generator is affixed to ring 68 which fits into a machined recess 70 in the housing, the horizontal interface between ring 68 and recess 70 being provided with a low friction disc 72 which may be made of Teflon cemented to the housing. The ring 68 carries an electrical contactor 74 which extends between stop members 76 and 78. Full rotative movement of ring 68 is prevented by the engagement of contactor 74 with one or the other of the stop members 76, 78. Sufficient angular movement of the ring 68 is permitted by adjustment of the stop member 76 and 78 to permit the electrical contactor 74 to make electrical contact with either the stationary contact 80 carried by the housing or the stationary contact 82 carried by the housing. Contactor 74 is connected to battery 84 which is in turn connected to coils 86 and 88, the latter being connected, respectively, to contacts 82 and 80. Thus when there is incipient clockwise rotation of the rotor 36, with reference to FIG. 5, clockwise rotation of contactor 74 brings it into engagement with contact 82, thereby energizing polarity switch coil 86. Incipient counterclockwise rotation of rotor 36 causes counterclockwise rotation of the contactor 74 (with reference to FIG. 5) to bring it into contact with contact 80, thereby energizing polarity switch coil 88 with the voltage of battery 84. Energization of coil 86 causes solenoid arm 90 to pivot to the left (FIG. 2) to move switch elements 92 into engagement with contacts 94, thereby enabling a signal of a given polarity to be passed to frequency differential indicator 28 and rate of change converter 30. On the other hand, energization of coil 88 causes the solenoid arm 90 to pivot to the right (FIG. 2) to thereby move the switch elements 92 into engagement with contacts 96 to thereby enable a signal of opposite polarity to be transmitted to indicator 28 and converter 30.

Figure 2:
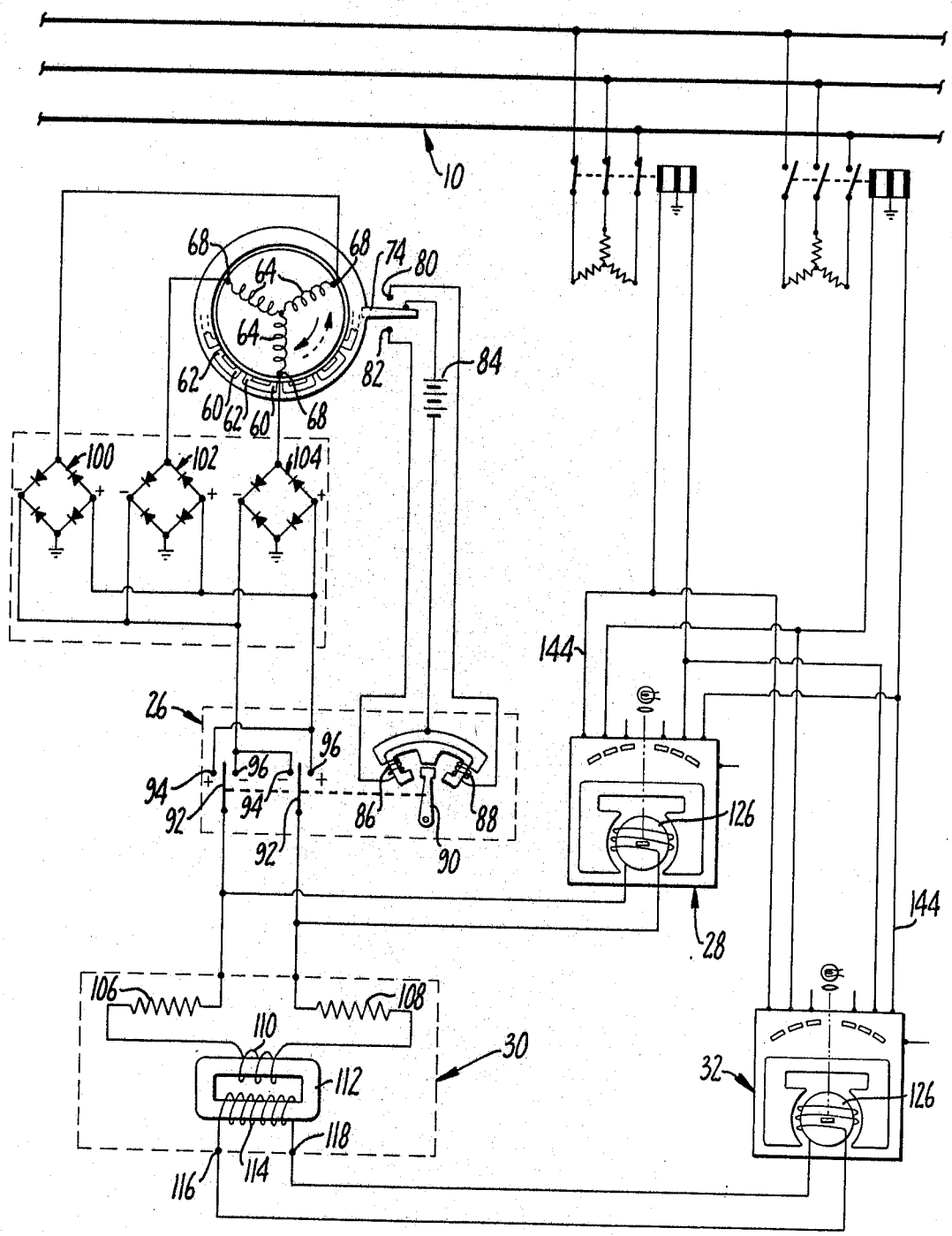
FIG. 2 is a semi-schematic view showing the protective apparatus of FIG. 1 in more detail.

As best shown in FIG. 2, the armature windings 64 are shown schematically as phase windings having the output terminals 68, said terminals being connected to bridge rectifiers 100, 102 and 104, the outputs of each of these bridge rectifiers being connected in parallel and having the appropriate polarities to deliver the algebraic sums of the individual alternating current phase outputs as an average DC voltage to the terminals 94 and 96.

The rate of change converter 30 is comprised of series resistors 106 and 108 and a low impedance primary winding 110 on a laminated magnetic core 112. The resistances 106 and 108 are high in relation to the impedance of winding 110 in order that the inductive counter EMF from changes in the DC output delivered at terminals 94 and 96 may not seriously affect the proportionality of the voltage at these terminals. Secondary winding 114 is provided to inductively generate a voltage at terminals 116 and 118 which, by established principles of electro-magnetics, is the first derivative of the voltage-time relation of the primary circuit of coil 110. The primary current is, by Ohms law, equal to voltage divided by resistance. This means that the current in coil 110 is essentially proportional to the voltage generated by the primary element 20. Since the voltage induced in coil 114 is proportional to the core magnetic linkage with the primary coil 110, the output at terminals 116 and 118 of the secondary coil 114 is essentially proportional to the rate of change of the voltage generated by the primary element 20, and consequently the induced output voltage at terminals 116 and 118 of coil 114 is essentially proportional to the rate of change of the frequency of the electrical system 10.

Figure 6:
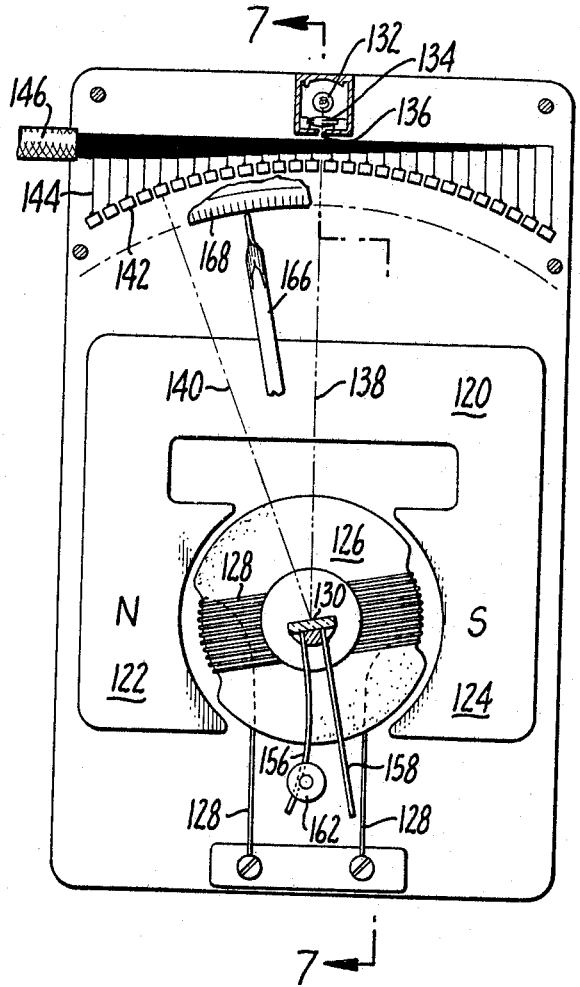
FIG. 6 is a view, partly in plan and partly broken away, of a moving coil galvanometer-type means to provide output signals for the actuation of circuit breakers in the power system.
Figure 7:
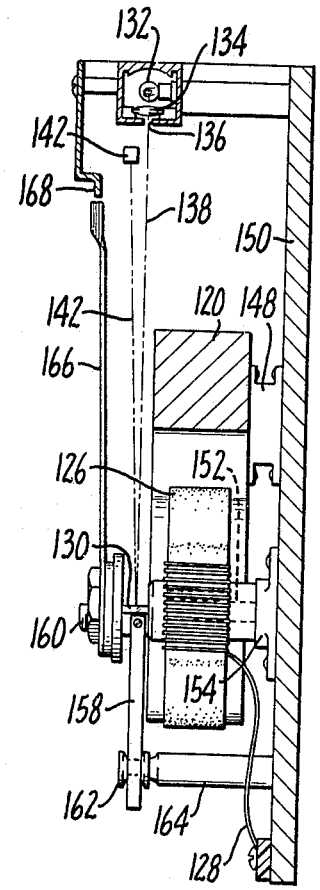
FIG. 7 is a view taken along lines 7—7 of FIG. 6.

FIGS. 6 and 7 illustrate a moving coil galvanometer arrangement which may be used in each of the indicators 28 and 32 to sense magnitude and polarity of the DC signals and to provide signal voltage outputs for the actuation of circuit breakers 14 in the power system 10. This moving coil galvanometer device comprises a permanent magnetic field core 120 having a north magnetic pole 122 and a south magnetic pole 124 to magnetically activate the ferro-magnetic rotatable core 126, said core 126 being provided with an electrical winding 128. Affixed upon the core 126 at its center of rotation is a plane mirror 130. A light source 132 is mounted in optical alignment with mirror 130 and emits a narrow pencil of light through collimating lens 134 and through a narrow optical slit 136 into the center of mirror 130. This light beam 138 is reflected as beam 140 which is directed to impinge upon one of a large number of photo-emissive cells 142 which are adapted to be selectively energized in accordance with the angular position of the rotor core 126 and, more particularly, to the angular position of the mirror 130 which is affixed thereto. The photo-electric cells 142 are electrically connected by means of paired, insulated leads 144 which are carried within conduit 146 and are thereafter connected to selected circuit breaker signal connections to operate as predetermined functions of the magnitude and polarity of the galvanometer voltage applied across the winding 128 of the rotor core 126.

FIG. 7 shows further details of the galvanometric signal generator device of FIG. 6. The permanent magnet core 120 is affixed by spacer member 148 to the instrument base 150. The rotatable core 126 is rotatably mounted on the pivot 152 which is affixed to support bearing 154 fastened to instrument base 150. Spring members 156 and 158 are fastened to rotor core extension 160 and are in essentially parallel orientation with respect to each other when the rotor core winding 128 is de-energized. The springs 156 and 158 coact with a freely rotatable grooved roller 162 carried for rotation by post 164 secured to base 150. When the rotor core winding 128 is energized, the inter-action of the permanent magnet field of core 120 with the magnetic flux resulting from the energization of the winding 128 causes the rotor core 126 to move rotatively until the magnetic torsional effect is balanced by the mechanical deflective force resulting from the inter-action of roller 162 and one of the two restraining spring members 156 and 158, depending upon the polarity of the energizing voltage impressed upon the winding 128. In the event that no voltage is impressed upon the winding 128, the rotor core 126 returns under the inter-active influence of one of the spring members 156 or 158 with roller 162 to a neutral or null position.

Mounted fixedly on rotor extension 160 is an indicator arm 166 which is in alignment with scale 168. The position of the indexing point end of indicator arm 166 on scale 168 indicates visually the magnitude and polarity of the signal voltage impressed on winding 128, thereby serving as a means of calibration and selection of individual photo-electric cell outputs for the activation of external devices, such as the circuit breakers, alarms, and the like.

As above-described, two frequency indicator and circuit breaker control systems are preferably employed in control relation to the amount of load 16 connected into the power system 10. The indicator 28 indicates the frequency of the electrical system 10 in terms of deviation, plus or minus, of said system in relation to the normal frequency of said system, and the indicator 28 concurrently actuates electrical circuits to open circuit breakers to switch off electrical load when the system load is in excess of system capability, as shown by excess reduction in the system frequency. Conversely, system frequency above normal indicates adequate capability on the part of the system 10 to handle further load, and thus the indicator 28 energizes control circuit to operate circuit breaker controls to restore electrical load.

The second indicator-relay control shows the rate of change of system frequency and, by energizing control circuits initiates circuit breaker action, or other control activity, to maintain the integrity of the electrical system 10. In the event that the frequency of sysem 10 decays at a rate that corresponds to a load increment greater than the system capability, control circuits are energized selectively to operate circuit breakers to reduce the system load to match the system capability. The provision of the rate of frequency change indicator 32 and the means responsive to its control make it practical to immediately cut out electrical load before the system frequency decays significantly, and in all situations such load is cut out before the system frequency has decayed to the point where generating equipment capability is impaired by sub-normal frequency. Conversely, an excessive rate of increase of system frequency, as sensed by indicator 32, is utilized to switch additional electrical load into the system, or to over-ride generation control and reduce output where normal over-speed control may have malfunctioned and endangered the equipment.

It should be pointed out that one of highly desirable features and advantages of the subject frequency variation protective device is that it can be connected to a network at any point along the system backbone. For instance, in the sequential operation of load breakers the locations of the breakers may be hundreds of miles apart which would make it impractical to control them from one central location. In such a situation, a second of the subject frequency variation protective devices, or any number of them, could be located conveniently with respect to the breakers, and any such number of said devices would each have identical responses after they had been calibrated carefully.

What is claimed is:

1. In combination, a first source of alternating current power which may vary in frequency as increments of load are connected thereto and disconnected therefrom, control switching means to connect and disconnect said load increments relative to said source, a second source of alternating current power relatively unvariable in frequency and having a frequency substantially corresponding with the normal frequency of said first source, means to compare the frequencies of said first and second sources and to provide a direct current voltage signal proportional to the difference between the frequencies of said sources, means to impress upon said proportional direct current voltage signal the further indication as to the sign of the difference between said frequencies, and means responsive to the receipt of said proportional direct current voltage signal of specific sign to selectively and automatically operate said control switching means.

2. The combination of claim 1 wherein said last-mentioned means selectively and automatically operates said control switching means in accordance with the difference between said frequencies and the sign of the difference between said frequencies.

3. The combination of claim 1 wherein said last-mentioned means selectively and automatically operates said control switching means in accordance with the instantaneous rate of change of the difference between said frequencies and with the sign of the difference between said frequencies.

4. The combination of claim 2 wherein said last-mentioned means includes a moving coil galvanometer adapted to receive said proportional signal of specific sign and selectively and automatically operate said control switching means.

5. The combination of claim 3 wherein said last-mentioned means includes means to convert said proportional direct current voltage signal of specific sign to a further direct voltage signal which is of the same specific sign and which is proportional to the instantaneous rate of change of the difference between said frequencies, and wherein said last-mentioned means further includes a moving coil galvanometer adapted to receive said further signal and selectively and automatically operate said control switching means.

References Cited

UNITED STATES PATENTS

| | | | |
|---|---|---|---|
| 3,153,728 | 10/1964 | Procter | 307—39 X |
| 3,271,580 | 9/1966 | Pope | 307—39 X |
| 3,359,551 | 12/1967 | Dennison | 307—39 X |

ROBERT K. SCHAEFER, Primary Examiner

H. J. HOHAUSER, Assistant Examiner